United States Patent [19]

Joho et al.

[11] 4,363,986

[45] Dec. 14, 1982

[54] ROTOR OF AN ELECTRICAL MACHINE

[75] Inventors: Reinhard Joho, Zürich; Herbert Pohl, Hausen, both of Switzerland

[73] Assignee: BBC Brown, Boveri & Company, Limited, Baden, Switzerland

[21] Appl. No.: 171,809

[22] Filed: Jul. 24, 1980

[30] Foreign Application Priority Data

Jul. 26, 1979 [CH] Switzerland .......................... 6906/79

[51] Int. Cl.³ .............................................. H02K 3/48
[52] U.S. Cl. ...................................... 310/214; 310/86; 310/194
[58] Field of Search ................. 310/214, 215, 86, 194, 310/262

[56] References Cited

U.S. PATENT DOCUMENTS 3,330,977  7/1967  Balke et al. .......................... 310/214
3,560,776  2/1971  Kildishev et al. .................... 310/214

*Primary Examiner*—Donovan F. Duggan
*Attorney, Agent, or Firm*—Oblon, Fisher, Spivak, McClelland & Maier

[57] ABSTRACT

A rotor of a turbine generator, wherein the field and amortisseur windings are held in place by means of axially and tangentially secured rings shrunk on the rotor body without the use of otherwise customary slot wedges. The rings are shrunk on the rotor body without overlapping and at a distance from each other. In this way, the magnetically effective rotor cross-section is increased up to 30% without reducing the size of the air gap.

12 Claims, 8 Drawing Figures

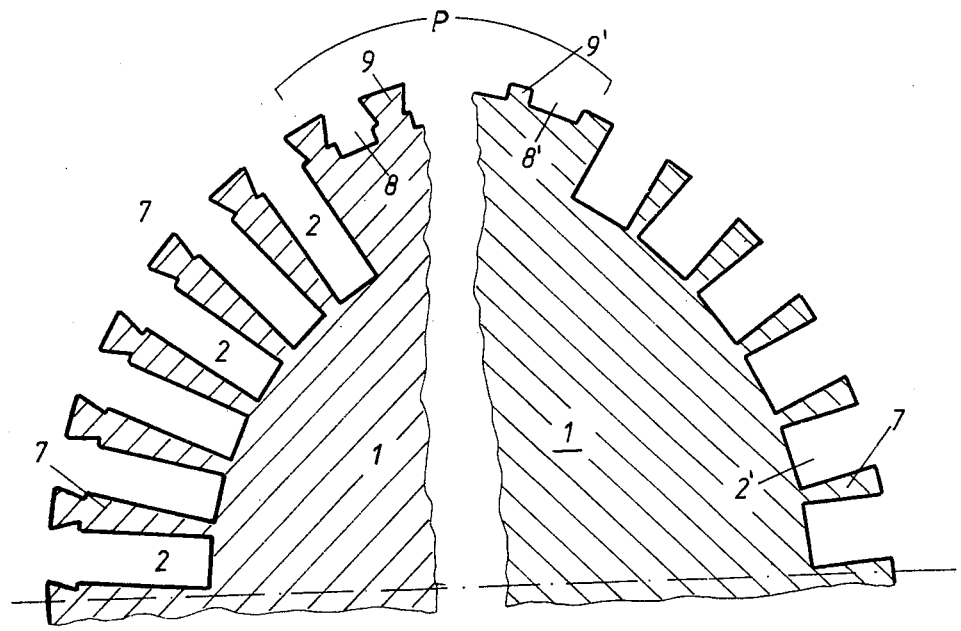
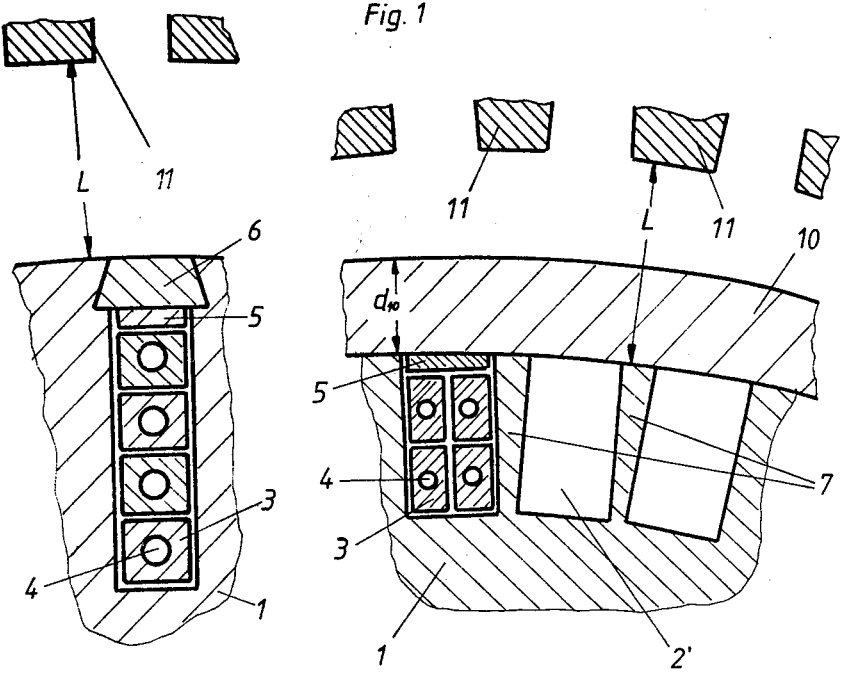
Fig. 1
Fig. 2a  Fig. 2b

ROTOR OF AN ELECTRICAL MACHINE

BACKGROUND OF THE INVENTION

1. Field of the Invention

This invention relates to a rotor of an electrical machine, especially a turbine generator, where the rotor winding is placed into grooves and secured against forces developing during operation by means of shrunk-on rings of nonmagnetic metal.

2. Description of the Prior Art

The limiting output of, for example, two-pole turbine generators has been increased during the past 30 years from about 100 to 1000 MVA, whereby the dimensions of the machines did not have to be even approximately enlarged to the same degree. This development was mainly made possible by means of better and better cooling methods and, caused by this fact, a better utilization of the active conductor material (water cooling) and, to a lower degree, by means of using better materials and production methods.

An additional step in the direction of an increase in the generator output is shown in the magazine "Elektrotechnik und Maschinenbau" (Electrical and Constructional Engineering) 89 (1972), Issue 1, pages 1-11, or in the AT Patent 292,833, respectively. Since the synchronous reactance becomes larger and larger with an increasing utilization of the machine, it is there proposed to design stator and rotor without teeth instead of making the air gap larger and larger. With such a design, the ironless winding space replaces the air gap to a large extent. In the toothless rotor, the winding conductors are arranged on top of each other in their straight portion in several layers limited by cylinder jacket surfaces. The conductors of radially adjacent layers are each staggered in this instance in the circumferential direction by one half of the conductor width. The rotor has a plurality of crossbars which serve the purpose of transmitting the momentum and of producing a concentric seat for a jacket of nonmagnetic steel which consists of overlapping tubes and which is shrunk on the rotor. This steel jacket, besides fastening the winding, has the task to relieve the shaft.

A rotor without teeth is also known from the German Publication 25 00 782, where the rotor winding is fixed by means of rings and expansible devices (rings filled with synthetic resin under pressure and hardened) arranged between the rings and the winding.

The proposals describing a turbine generator completely without teeth in "Proc. IEE", Vol. 120, No. 12, December 1973, pages 1507-1518, aim in the same direction. The rotor winding is arranged on an entirely smooth steel cylinder and is held in place by means of bindings or rings or steel, titanium or carbon fiber-reinforced plastics.

SUMMARY OF THE INVENTION

Accordingly, one object of this invention is to provide a novel rotor of an electric machine, especially a turbine generator, based on the idea of increasing the magnetically effective cross-section in the rotor.

A further object is to provide a novel rotor of the type mentioned which can lead to a considerably higher magnetic flux with, in comparison to conventional rotors, uniform rotor diameter without having to use basically new production technologies and materials and without impairing the operational safety of the machine.

These and other objects are achieved according to the invention by providing a new and improved rotor having a rotor winding placed into grooves and secured against operational forces by means of shrunk-on rings of non-magnetic material, wherein the rings are shrunk on the rotor body without overlapping and at a distance from each other.

In the case of the rotor according to the invention, slot wedges and correspondingly designed tooth faces can be eliminated. The rotor winding is closer to the air gap. Thus, the magnetically effective rotor cross-section is enlarged by up to 30%. This rotor is only exposed in its activated part to those stresses which develop from its own centrifugal force. It is no longer subjected to the centrifugal forces of the winding. Therefore, the mechanical properties of the used steel loses its importance in comparison with its magnetic properties.

It is possible to only cut one wide slot each between the pole zones with the rotor construction according to the invention, whereby the carrying function of the teeth is eliminated, and to place the winding as a whole into the wide slot. However, in accordance with a preferred design of the invention, individual slots are provided each with two conductors next to each other, and two on top of each other in case of two-pole machines or two conductors next to each other and three on top of each other in case of four-pole machines. In this way, a lower load is placed on the conductor insulation in case of unusual operating conditions (torque jolts in short-circuit and such). Additionally, the rings rest more uniformly on their circumference.

As a whole, the elimination of deep slots in the rotor is also very advantageous from another point of view, i.e. the shaft diameter on the driving side can be increased to the same extent as the core diameter of the rotor. Thus, approximately twice the torque can be transferred from the operating machine to the generator—with the same torsional stress of the shaft.

In accordance with a first advantageous design of the object of the invention, the axial length of the rings is smaller than half the outer diameter of the rotor. Preferably, the ratio of the axial length l of the rings to the pole pitch $\tau_p = \pi d/2P$, wherein d indicates the outer diameter of the rotor and p the pole pair number, is between the values 0.05 and 0.25. Therefore, the rings are between 100 and 500 mm long in case of two-pole rotors and rotor diameters of 1250 mm. This dimension of the axial length of the rings represents a compromise between two opposing requirements: on the one hand, efforts must be made to keep the number of rings within a reasonable limit since each ring must be secured in axial and tangential direction; on the other hand, "long" rings have an essential influence on the electric/magnetic characteristics of the machine. The rotor surface losses, consisting of the electrical losses by means of the armature harmonics, pulsation, inverse field and the mechanical losses by means of friction in the air gap gas, occur mainly in the rings. By increasing the number and concomitantly shortening the rings, it is possible to force the place of development of the electrical losses (especially inverse field—and partially armature harmonics losses) into the amortisseur winding located under the rings which accomplishes this task more efficiently with respect to material (as a rule, copper) and cooling (by means of the directly adjacent, cooled rotor winding or even the direct cooling of the amortisseur winding). Also, the subtransient reactance is increased (in the desired manner) with a decrease in the length of the rings while the portion of the maximum short-circuit momentum on the rings is reduced.

The rings carry only the axially running portion of the winding and not, as the rotor caps, and additionally also the front coil connections in the rotor coil end. They can, therefore, be made with a considerably lower wall thickness than the end caps with the same mechanical stress. While the radial thickness of the rotor caps amounts to approximately 120 mm in the case of rotors produced today, a thickness of about 60 mm, using the same material, is sufficient for the rings.

Each ring is axially and tangentially secured in the pole zones in accordance with a further development of the invention. The axial securing is effected in that at least one nose-like projection is provided on the inner surface of each ring in one or both ring end zones and the rotor body has corresponding recesses in the teeth, being open at least towards one amortisseur winding slot, in the pole zone. For the tangential securing of the rings, one- or multi-part breech parts are inserted into the amortisseur winding slots adjacent to the recesses which are either part of the amortisseur winding or represent independent components. The last mentioned measure has practically no effect on the electrical characteristics of the rotor since only a portion of the amortisseur winding in the pole zones is removed from its actual task.

In order to compensate for the moments of inertia in the pole and neutral axis of the rotor body, cross slots are provided in the pole zones running orthogonally to the rotor axis and covering the entire width of the pole zones, with their depth corresponding approximately to the depth of the field winding. Their width amounts to between 5 and 10 mm. They are distributed over the entire length of the active portion in a uniform fashion and are placed in such a manner that they preferably coincide with the separating lines of the rings. This counteracts an otherwise possible relative movement between the rings and the rotor surface during operation.

Each of the rings is centrally provided with a balancing groove. This groove has a hammer head-like or dovetailed cross-section. Preferably two-part clamping balancing weights can be placed into these grooves. The depth of the groove preferably amounts to $\frac{2}{3}$ of the thickness of the ring. These grooves fulfill additionally the purpose of subdividing the rings in electric or magnetic respect in that rings with a groove designed in such a fashion act in an electric/magnetic respect as to two individual rings. Thus, the overall electric losses per ring are reduced while the subtransient reactance of the (entire) rotor grows in the desired manner owing to the further subdivision.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein:

FIG. 1 is a schematic cross-sectional view of a conventional turbine generator and of one according to the invention;

FIG. 2a is a cross-sectional view of a slot of a conventional rotor, and

FIG. 2b is a similar view of a rotor according to the invention;

DESCRIPTION OF THE PREFERRED EMBODIMENTS

Figure 3:
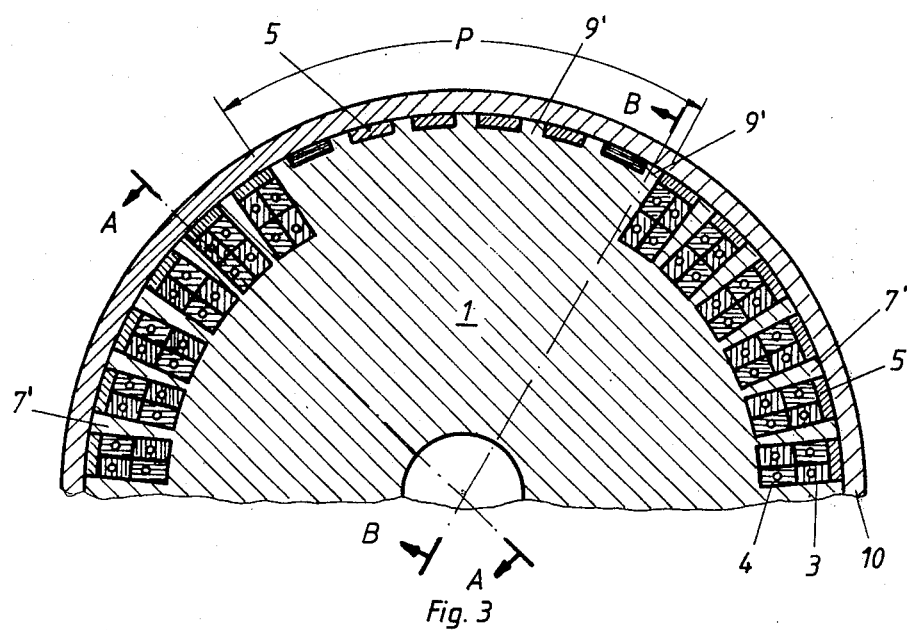
FIG. 3 is a radial cross-sectional view through a two-pole turbine generator rotor with a two-layer field winding and an amortisseur winding according to the invention.

Referring now to the drawings, wherein like reference numerals designate identical or corresponding parts throughout the several views, and more particularly to FIG. 1 thereof, according to the invention axially running slots 2 are cut into the rotor body 1 to receive a field winding in the case of a conventional rotor as it is illustrated in the left half of FIG. 1. As can be noticed from FIG. 2a, it consists of winding conductors 3 placed on top of each other and insulated towards each other. The winding conductors 3 have each a central borehole 4 through which a cooling agent, for example water, can be passed. An amortisseur winding conductor 5 is placed above the winding conductors 3. The slot is closed by a slot wedge 6 which is supported by the rotor tooth faces 7. The slot wedge 6 secures, in connection with the correspondingly designed outer ends of the rotor teeth 7, the field and amortisseur winding against the effect of centrifugal forces while the support in circumferential direction is effected by the tooth flanks. Slots 8 are also provided in the pole zone P to receive the amortisseur winding 5 distributed uniformly over the rotor circumference whose tooth faces 9 have a similar design as the rotor teeth 7.

In the case of the rotor according to the invention as it is schematically shown in the right half of FIG. 1 or in FIG. 3, respectively, the slots 2' to receive the field and amortisseur windings are also running axially. The slot or tooth flanks are entirely even. The same applies to the amortisseur winding slots 8 or the teeth 9, respectively, arranged in the pole zone P. The depths of the slots of field and amortisseur winding slots are considerably lower in comparison with a conventional rotor. In the case of the amortisseur winding slots 8, the depth is at least reduced by the thickness of the slot wedge. In the case of the field winding slots 2', on the other hand, the slot depth (in the design of a two-pole rotor as shown here) is reduced by one wedge thickness and two winding conductor thicknesses. It is, of course, within the framework of the invention to dimension the slot width and depth in such a fashion that four winding conductors and one amortisseur winding conductor are above each other in each slot in the case of a two-pole machine or that (again in case of two-pole machines) all four winding conductors are arranged in one slot next to each other. The arrangement shown in FIG. 1 (left half) or FIG. 2b and FIG. 3, respectively, represents, however, an optimum between ideal winding and control of the tangential forces acting on the winding conductors.

Amortisseur winding and field winding are secured against centrifugal forces occurring during operation by means of shrunk-on rings 10 of nonmagnetic steel as it is, for example, also used for the rotor caps whose thickness $d_{10}$ amounts to about 60 mm in the case of an 800 MVA machine. These rings are placed in the air gap L as can be noticed from FIG. 2b, where the pertinent stator of the machine is symbolized by its stator teeth 11. A comparison of the positions of field and amortisseur windings in FIGS. 2a and 2b shows clearly that, with the same effective air gap L, the invention permits a by far closer approach to an ideal winding than in the case of conventional rotors.

Figure 4:
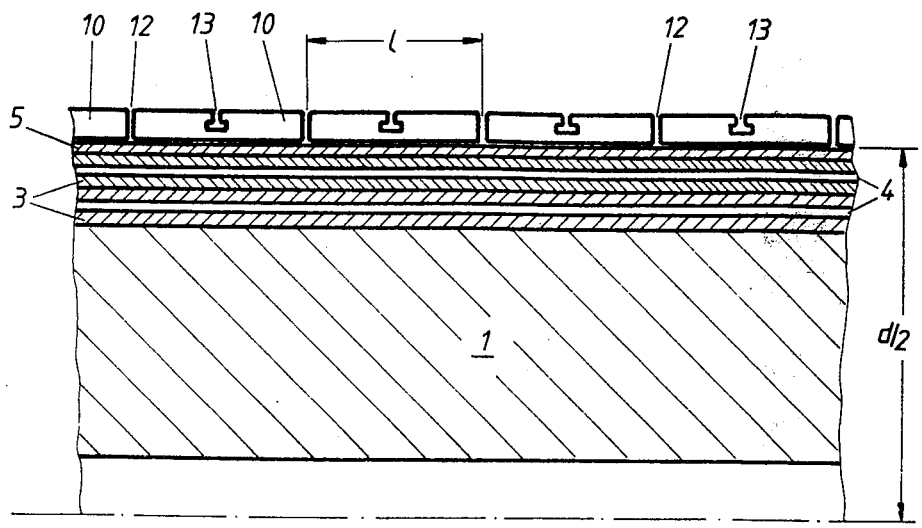
FIG. 4 is a longitudinal cross-sectional view through a rotor according to FIG. 3, along the line A—A.
Figure 7:
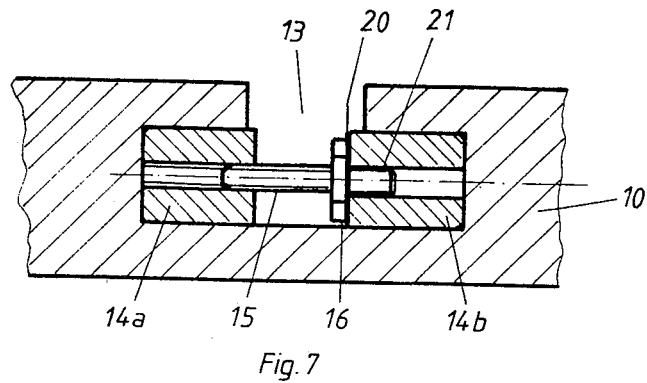
FIG. 7 is a cross-sectional view through a balancing groove with a balancing weight clamped into the groove.

As can be noticed from the longitudinal cross-section according to FIG. 4, a multitude of rings 10 which are narrow in comparison with the rotor diameter d are shrunk on the rotor body 1. The rings rest on the rotor teeth 7 or the amortisseur teeth 9. It is of little importance to what extent the windings in the slots 2 or 8, respectively, are pressed together in this way since these windings rest against the inner sides of the rings under the effect of the centrifugal forces. There is a small gap 12, having a size of a few millimeters, between the individual shrunk-on rings in order to meet possible movements between the rings. Each ring has centrally a circular balancing groove 13 which is closed in itself. It has a hammer head-like or dovetailed cross-section. If required, two-part damper weights 14a, 14b can be placed into these grooves (FIG. 7). The two parts 14a, 14b have a threaded or passage borehole and are clamped into the balancing groove 13 by means of threaded bolt 15 with a one-sided rigid hexagonal flange 16. After loosening the threaded bolt 15 and screwing it into part 14a, part 14b can be moved in circumferential direction of the groove 13, whereupon also part 14a can be removed. An insulation disk 20 is provided between the flange 16 and part 14b for the electrical insulation between both parts 14a, 14b. The end of the threaded bolt 15 projecting into the borehole in part 14b carries an insulating sleeve 21.

Figure 5:
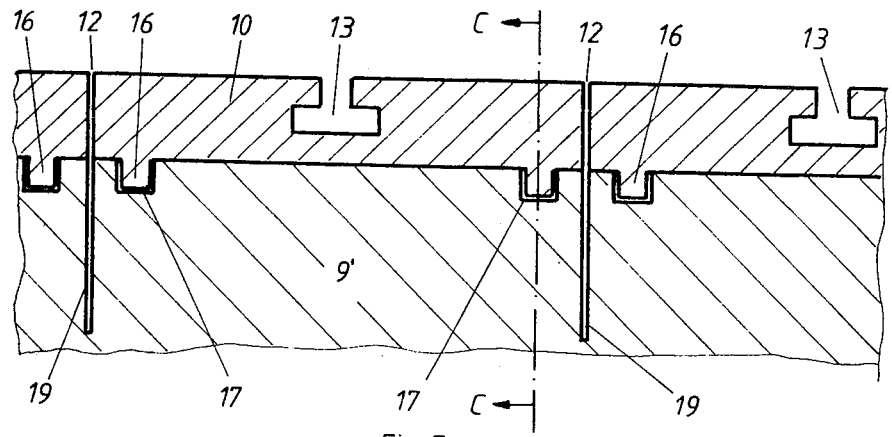
FIG. 5 is an additional longitudinal cross-sectional view through a rotor according to FIG. 3 along the line B—B, on an enlarged scale.
Figure 6:
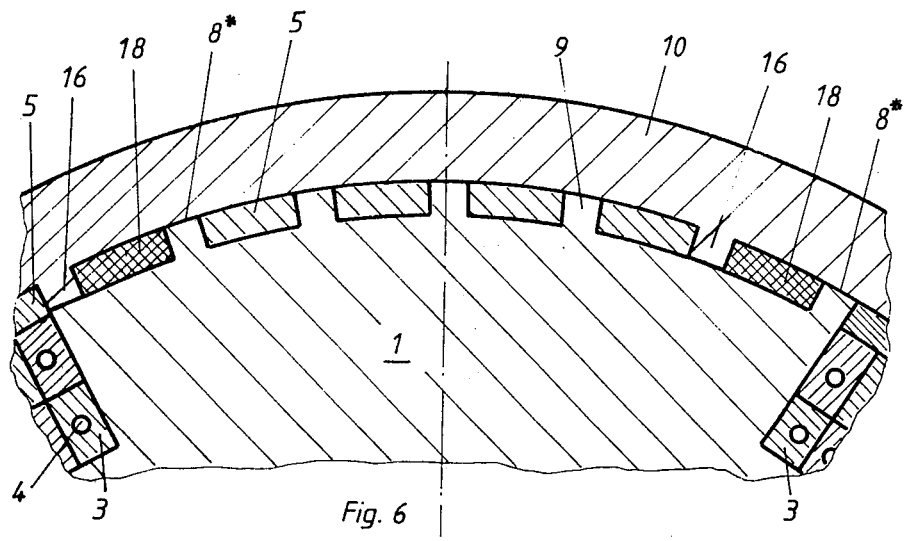
FIG. 6 is a radial cross-sectional view through a rotor according to FIG. 5 along the line C—C.

Besides the shrunk connection, the rings are additionally secured in axial and tangential directions. For this purpose, each ring 10 has on its inner side nose-like projections 16 (FIGS. 5 and 6). The width of the projections measured in circumferential direction corresponds approximately to the width of the amortisseur teeth 9. The distance from each other amounts to an integral multiple of the groove division. Recesses 17 running in a circumferential direction are provided in the amortisseur teeth 9 at appropriate points into which the nose-like projections 16 of the rings 10 engage.

During the assembly, the rings 10 which have first been heated to a temperature of approximately 250° C., for example, inductively, are placed on the wound rotor in such a manner that the nose-like projections 16 come to rest in free amortisseur slots 8*, 7*. The rings are turned in the provided place by the width of one amortisseur tooth. Subsequently breech parts 18 are placed into the amortisseur slots 8* for the tangential securing of the rings 10. These can—but must not—be axially divided. The breech parts, also with subdivision, form part of the amortisseur winding by means of a suitable design of the contact points, for example, by means of overlapping points on the end side (not shown), and the use of electrically good conductive material (copper). As a compensation for the moments of inertia in the pole and neutral axis of the rotor, cross slots 19 running orthogonally to the rotor axis are provided in the rotor body 1 (FIG. 5). They extend across the entire width of the pole zone P and are approximately as deep as the field winding slots 2. Their width amounts to between 5 and 10 mm. They are uniformly distributed over the entire length of the active portion and are aligned with the gaps 12 between two successive rings 10.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotor of an electrical machine, especially a turbine generator, wherein at least one rotor winding is placed into grooves formed in a rotor body and secured against forces developing during operation by means of rings of nonmagnetic material, said rotor having pole zones, comprising:
   said rings being secured without overlapping and at a distance from each other on the rotor body with said rings axially and tangentially secured in the pole zones;
   said rings having nose-like diametrically opposite projections provided on an inner surface thereof in the pole zone area in at least one ring end zone; and
   said rotor having corresponding recesses open at least towards one groove in the pole zones whereby one or multi-part breach components slide into at least one of the grooves adjacent to the recesses.

2. A rotor according to claim 1, further comprising: said rings having an axial length (l) smaller than half the outer diameter (d) of the rotor.

3. A rotor according to claim 1, further comprising: said rings having an axial length (l) wherein the ratio of the axial length (l) of the rings to the pole pitch ($\tau p$) is between the values 0.05 and 0.25.

4. A rotor according to claim 1, further comprising: the breech components being part of an amortisseur winding.

5. A rotor according to any one of claims 1, 2, 3, or 4, further comprising:
   transverse slots provided in the rotor body and running in the pole zones orthogonally to the rotor axis and extending across the entire pole zone.

6. A rotor according to claim 5, further comprising:
   the transverse slots approximately aligned with the gaps between two successive rings; and
   the depth of the slots corresponding approximately to the depth of the grooves of a field winding.

7. A rotor according to claim 1, further comprising:
   said rings being provided with at least one balancing groove which is preferably centrally arranged and closed in itself.

8. A rotor according to claim 7, further comprising: said at least one balancing groove having a depth less than or equal to $\frac{2}{3}$ of the ring thickness ($d_{10}$).

9. A rotor according to claims 7 or 8, further comprising:
   two-part damper weights placed into the balancing groove.

10. A rotor according to claim 9, wherein said damper weights are insulated from each other.

11. A rotor according to one of claims 1, 2, 3, or 4, wherein, in the case of a two-pole rotor, plural windings are arranged in a field winding groove next to each other and in two layers on top of each other.

12. A rotor according to claims 1, 2, 3, or 4, wherein, in case of a four-pole rotor, plural windings are arranged in a field winding groove next to each other in three layers on top of each other.

* * * * *